United States Patent [19]
Füller et al.

[11] Patent Number: 5,650,182
[45] Date of Patent: Jul. 22, 1997

[54] BARLESS MOLD CLOSING DEVICE FOR INJECTION MOLDING MACHINES

[75] Inventors: Klaus Füller; Peter Siegert, both of Schwerin; Jörg Holst, Raben-Steinfeld, all of Germany

[73] Assignee: Hemscheidt Maschinentechnik Schwerin GmbH & Co., Schwerin, Germany

[21] Appl. No.: 490,308

[22] Filed: Jun. 14, 1995

[30]  Foreign Application Priority Data

Jun. 14, 1994 [DE] Germany ........................ 44 20 639.9
Mar. 30, 1995 [DE] Germany ........................ 195 11 808.1

[51] Int. Cl.⁶ .................................................. B29C 45/64
[52] U.S. Cl. .................... 425/589; 100/231; 100/258 A; 425/451.9; 425/595
[58] Field of Search ............................ 425/589, 595, 425/450.1, 451.9; 100/231, 258 A

[56]  References Cited

U.S. PATENT DOCUMENTS

| | | | |
|---|---|---|---|
| 3,773,451 | 11/1973 | Bielfeldt et al. | 425/589 |
| 4,571,169 | 2/1986 | Shima et al. | 425/589 |
| 4,606,717 | 8/1986 | Polak et al. | 425/589 |
| 5,143,736 | 9/1992 | Kumamura et al. | 425/589 |
| 5,249,951 | 10/1993 | Leonhartsberger et al. | 425/451.9 |

FOREIGN PATENT DOCUMENTS

| | | |
|---|---|---|
| 0 554 068 A1 | 4/1993 | European Pat. Off. . |
| 1281143 | 10/1968 | Germany .............. 425/589 |
| 92 12 480.1 U | 7/1993 | Germany . |

*Primary Examiner*—James P. Mackey
*Attorney, Agent, or Firm*—Cohen, Pontani, Lieberman, Pavane: Christa Hildebrand

[57]   ABSTRACT

The invention relates to a barless mold closing device for injection molding machines, which absorbs the mold closing and opening forces via a C-shaped machine frame, in which plate bending is minimized by asymmetrical internal die forces and eccentric opening forces and the load on the die guides and in which it is possible to automatically compensate for non-parallelisms at the die parting line. The solution calls for the fixed die mounting plate 2 and/or the end plate 4 to be supported in two horizontal bearing axes 9, 10 and 11, 12 above and below the axis of injection 7. The lower bearing axes 10, 12 are connected to the fixed die mounting plate 2 and/or to the end plate 4 via elastically deformable components 13 in such a way that these components are connected to the elastic deformation of the machine frame 1, so that there is no angular deviation from the vertical position of the mounting surfaces 2.1, 3.1. In each case, the end plate 4 or the die mounting plate 2 can also be mounted in a uniaxial fashion in the machine frame 1 and thus be disconnected from the deformation of the machine frame 1.

15 Claims, 14 Drawing Sheets

BARLESS MOLD CLOSING DEVICE FOR INJECTION MOLDING MACHINES

BACKGROUND OF THE INVENTION

1. Field of the Invention

The invention relates to a barless mold closing device for injection molding machines, having a C-shaped machine frame, on one leg of which a fixed die mounting plate is arranged and on the other leg of which an end plate is arranged. Between these legs, a movable die mounting plate can be moved longitudinally on guides with the help of a linear drive, which is supported in the end plate and the movable die mounting plate. The fixed die mounting plate and the movable die mounting plate have mounting surfaces to hold the mold halves of a molding die. The mold closing and opening force produced by the linear drive during the injection and opening process is absorbed by the machine frame.

2. Description of the Related Art

From DE 9212480 U1 and EP 0554068 A1, generic barless mold closing devices are already known, the advantage of which is that the die space between the fixed and movable die mounting plates is freely accessible. As a result, gaining access to the die and changing the die are considerably simpler than in mold closing devices with die mounting plates that are connected by bars. Furthermore, in barless mold closing devices, because of better utilization of the die mounting surface, it is possible to use larger dies in injection molding machines with a smaller closing force. In barless injection mold machines, the large closing and mold expansion forces occurring during the injection process and the mold opening forces occurring during the opening process lead to a deformation of the machine frame, which consists of a longitudinal expansion and a superimposed bending deformation, the latter of which may result in non-parallelisms at the die parting line.

In DE 9212480 U1 and EP 0554068 A1, the problem is solved by the fact that the two die mounting plates are supported horizontally and uniaxially and are tiltable, allowing plane parallelism to be maintained. In DE 9212480 U1, in order to prevent the movable die mounting plate from lifting up from the machine frame, the movable die mounting plate has a shoe which is connected to a guide rail in a positive-locking manner. The guide rail is supported either on the fixed die mounting plate in a one-sided fashion or on the machine frame. In order to ensure elastic movement between the movable die mounting plate and the guide rail, springs are arranged between the shoe and the movable die mounting plate, or the guide rail is attached to the machine frame by means of springs. The disadvantage of this solution is that when the plastic mass is injected into the cavity of the molding die, the large internal die pressure which prevails and the uniaxial bearing of the two die mounting plates may lead to a deformation of the die mounting plates in the upper and lower border regions. These deformations may be of various sizes, depending on the geometry of the mold part and the position of the cavity in the molding die. It may even be necessary structurally to locate cavities with a large surface at a wide distance from the horizontal central axis, in the external upper or lower border region of the molding die. In order to prevent an expansion of the molding die during the injection process and to ensure the production of high-quality mold parts, the die mounting plates must therefore be designed with considerably thicker walls as the size of the mounting surface increases. Furthermore, the guides for the molding dies and the movable die mounting plate as well as the bearings for the movable die mounting plate, the end plate, and the movable and fixed die mounting plates are under different loads and, as a result, are subject to rapid wear.

In EP 0554068 A1, generic designs that vary structurally are described and depicted. The end plate and the fixed die mounting plate as well as, in part, the movable die mounting plate are supported in uniaxial and articulated fashion. However, the forces arising during the production of the mold closing and opening force are absorbed chiefly by a so-called locking assembly, which consists of two plates arranged in the longitudinal direction, in which the end plate and the fixed die mounting plate are supported in an articulated fashion.

The movable die mounting plate, the fixed die mounting plate and the end plate are thereby run or supported on the machine framework. This solution has a further disadvantage, in addition to these described above, namely, that the plates arranged in the longitudinal direction for the locking assembly necessitate high additional material and cost expenditure.

SUMMARY OF THE INVENTION

The object of the invention is to find a solution in which the mold closing and opening force is absorbed mainly by the machine frame, in which plate bending is reduced by means of asymmetrical internal die pressures and eccentric opening forces and the load on the die guide, and with which the existing slight non-parallelisms which normally arise between the die halves of the molding dies because of the expansion of the machine frame are automatically avoided.

According to one aspect of this invention, a barless mold closing device for injection molding machines, consisting of a C-shaped machine frame, on one leg of which a fixed die mounting plate is arranged and on the other leg of which an end plate is arranged, between which a movable die mounting plate is longitudinally movable on guides toward the fixed die mounting plate in the direction of an axis of injection with the help of a linear drive that is mounted in the end plate and the movable die mounting plate, and in which the fixed die mounting plate and the movable die mounting plate have mounting surfaces oriented vertically to the axis of injection for holding the mold halves of a molding die, and in which the mold closing and opening force that is produced during the injection and opening process by the linear drive is absorbed by the machine frame. This object is attained through the fact that the fixed die mounting plate and the end plate are mounted in the legs of the machine frame above and below the axis of injection in at least two horizontal bearing axes which run at a right angle to the axis of injection. The end plate and the fixed die mounting plate are thereby connected to the lower bearing axes by at least two elastically deformable components in such a way that the expansion of the C-shape produced by the closing force or the locking force is partially absorbed by a defined elastic deformation of the components, so that the mounting surfaces of the die mounting plates remain in their vertical positions without any angular deviation.

The advantages of the barless mold closing device according to the invention are that the multiaxial horizontal bearings of the end plate and the fixed die mounting plate ensure that unobstructed access to the die space of the mold closing device is maintained. Furthermore, the rigidity of the two die mounting plates is increased. This makes it possible to reliably accommodate even substantially larger molding dies with asymmetrical cavities in a barless mold closing device without reinforcing the die mounting plates.

In addition, the intended arrangement of elastically deformable components below the axis of injection ensures that slight non-parallelisms existing between the die halves of the molding dies are automatically compensated with a low expenditure of energy. The guide accuracy for the die guides is not diminished and the unwanted emergence of molten plastic at the die parting line is prevented.

According to the invention, however, it is also possible for either the fixed die mounting plate or the end plate to be supported in the associated leg of the machine frame in at least two bearing axes which run horizontally above and below the axis of injection. Accordingly, the fixed die mounting plate or the end plate is connected to the lower bearing axis in the leg of the machine frame via at least one component that can be elastically deformed in such a way that the expansion of the C-shaped machine frame produced by the occurring closing force or locking force is compensated for by a defined elastic deformation of the component or components, so that the mounting surface of the fixed die mounting plate or the mounting surface of the movable die mounting plate and/or the end plate remains in its vertical position.

This solution is based on the realization that it can suffice, in order to maintain parallelism, to support only the fixed die mounting plate or only the end plate according to the invention, allowing the other respective plate to be accommodated in the machine frame in a less complicated fashion. Thus, in a further design form of the invention, there is biaxial support of the fixed die mounting plate, while the linear drive is accommodated in the machine frame by a joint in an articulated and uniaxial fashion and the movable die mounting plate and the linear drive are connected to one another by a joint, which is preferably designed as a ball joint. The biaxial bearing of the fixed die mounting plate has the advantage of allowing no degree of freedom to turn and thus not being tiltable or pivotable. Nonetheless, the closing force or locking force which arises leads to a defined elastic deformation of the components so large that no angular deviation of the vertical position of the mounting surface from the fixed die mounting plate occurs. The deformation of the fixed die mounting plate is thus connected to the deformation of the machine frame. The uniaxial bearing of the linear drive and of the movable die mounting plate lends to these plates a limited degree of freedom to turn and makes them tiltable or pivotable. In order to prevent the movable die mounting plate from tilting, this plate has guide rollers arranged in pairs on its underside. The guide rollers encompass guide rails, which are mounted on the inner side of the machine frame in joints. In this way, when the closing and locking force is exerted, the movable die mounting plate is disconnected from the deformation of the machine frame. The combination of these two solution variants always ensures exact plane parallelism of the mold halves of the molding die in the die separation plane during the exertion of the closing and locking force.

In another embodiment of the invention, the fixed die mounting plate is accommodated in the machine frame uniaxially via a joint, while the movable die mounting plate and the linear drive are connected to one another by a joint, which is preferably a ball joint. In this embodiment, only the end plate is supported in the associated leg of the machine frame above and below the axis of injection in at least two horizontal bearing axes running at a right angle to the axis of injection. In this case, the end plate is connected to the lower bearing axis in the leg of the machine frame via elastically deformable components. The closing or locking force exerted leads to a defined elastic deformation of the components such that the working line of the force of the linear drive at the deformation of the machine frame is not able to deviate from of the axis of injection. This ensures that upon the exertion of the closing force, the piston rod of the linear drive is relieved from transverse forces and the die guides are protected. In this embodiment, both the fixed die mounting plate and the movable die mounting plate have at least a degree of freedom to tilt or to turn, because of the uniaxial or calotte support. Plate parallelism in the die separation plane is ensured through the following measures.

When the mold closing and opening force is exerted, the two die mounting plates with the die halves of the molding die are disconnected on one side from the deformation of the machine frame. This makes it necessary for the movable die mounting plate to be connected in a positive-locking fashion to the guide rails in a manner analogous to that described above and to be rollable on them. In addition, in the last-mentioned solution, the guide rails in the area of the fixed die mounting plate are screwed on below the fixed die mounting plate. In contrast, at the other end, in the area of the end plate, the guide rails are connected to the machine frame via joints. For the purpose of expansion balance, in light of the deformation of the machine frame resulting from the exertion of the closing force, there is a longitudinal slot in each guide rail. The biaxial bearing of the fixed die mounting plate in the machine frame better ensures access to the injection nozzle (not depicted). The biaxial bearing of the end plate is advantageous for better access to the hydraulic ports of the linear drive.

In the further embodiment of the invention with a biaxial bearing of the fixed die mounting plate and the end plate, the bearing axes located above the axis of injection preferably lie on an upper horizontal plane and the bearing axes located below the axis of injection preferably lie on a lower horizontal plane. In addition, the upper bearing axes and the lower bearing axes preferably have different distances to the mounting surface of the particular die mounting plate in question.

According to a further embodiment of the invention, there are guide rails arranged below and between the end plate and the fixed die mounting plate on both sides on the machine frame; these guide rails are connected to the machine frame in a rotatable manner at their ends via joints. During the opening and closing movement, the movable die mounting plate is guided and supported on the guide rails in a manner permitting longitudinal motion. This type of guidance and support of the movable die mounting plate ensures that the guides are not placed under addition stress during deformation of the machine frame through one-sided expansion or opening forces. According to the invention, the elastically deformable components arranged below the axis of injection may be designed in various ways. For example, in one embodiment, the elastically deformable components consist of compression bars arranged in pairs, which are detachably connected at one of their ends to the end plate or the fixed die mounting plate and are connected at the other end to the bearing axes arranged in the machine frame below the axis of injection. Another embodiment of the elastically deformable components consists of support arms, which are reduced in cross-section in the middle area by cut-outs or recesses. In this case, the support arms are a permanent part of the end plate or the fixed die mounting plate.

The embodiment of the invention also calls for the guide rails to be supported at their ends in articulated fashion on a bolt on both sides of each side wall of the machine frame. The bolt is held in bearing bushes arranged in the side walls of the machine frame. This arrangement and support of the guide rails ensures that the deformation forces acting on the machine frame during the production of the mold closing and opening force are partially absorbed by the guide rails. Because the movable die mounting plate can be moved on the guide rail in a roller guide or a sliding guide, the deformation forces acting on the machine frame do not effect the plane parallelism between the movable die mounting plate and the fixed die mounting plate. The roller guide consists of rollers which are supported on the underside of the movable die mounting plate in vertical and horizontal bearing axes and which are able to roll on the guide rails.

If a sliding guide is selected instead of a roller guide, then on the underside of the movable die mounting plate there are lateral grooves, which are lined with sliding material and arranged in such a way as to encompass the guide rails.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawing wherein like reference numerals delineate similar elements throughout the several views.

DETAILED DESCRIPTION OF THE PREFERRED EMBODIMENTS

Figure 1:
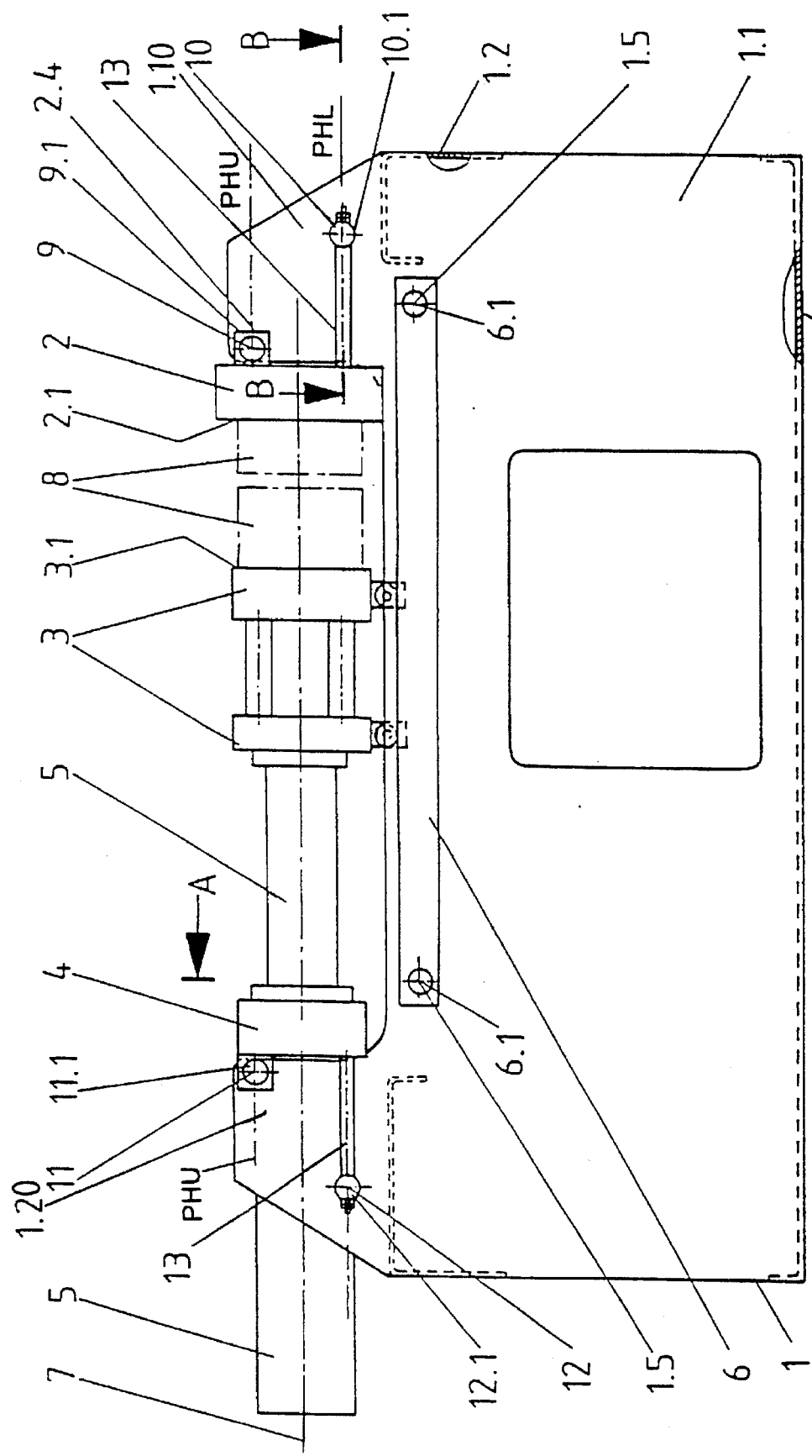
FIG. 1 illustrates a front view of a barless mold closing device with interchangeable elastically deformable components.

The barless mold closing device shown in FIG. 1 includes a C-shaped machine frame 1. On the one leg 1.10 is arranged the fixed die mounting plate 2 and on the other leg 1.20 is arranged the end plate 4. In the example, the machine frame 1 is formed by two side walls 1.1, which are connected to one another by the spacers 1.2 and a base 1.3. Between the fixed die mounting plate 2 and the end plate 4, the movable die mounting plate 3 may be moved on guide rails 6 with the help of the linear drive 5. The linear drive 5 consists of a hydraulic working cylinder and is mounted in the end plate 4 and the movable die mounting plate 3. With the help of a hydraulic control, which is not the subject of this invention, the hydraulic working cylinder simultaneously produces the necessary closing and opening force for closing and opening the die halves of the molding die 8. In order to hold the die halves of the molding die 8, the fixed die mounting plate 2 and the movable die mounting plate 3 have the respective mounting surfaces 2.1 and 3.1. The fixed die mounting plate 2 is supported in the horizontal bearing axes 9 and 10, and the end plate 4 is supported in the horizontal bearing axes 11 and 12, which are arranged in the area of the legs 1.10, 1.20 of the machine frame. All bearing axes 9, 10, 11 and 12 are arranged at a right angle to the axis of injection 7 and preferably have different distances to the mounting surfaces 2.1 and 3.1 of the respective die mounting plates 2 and 3.

Figure 2:
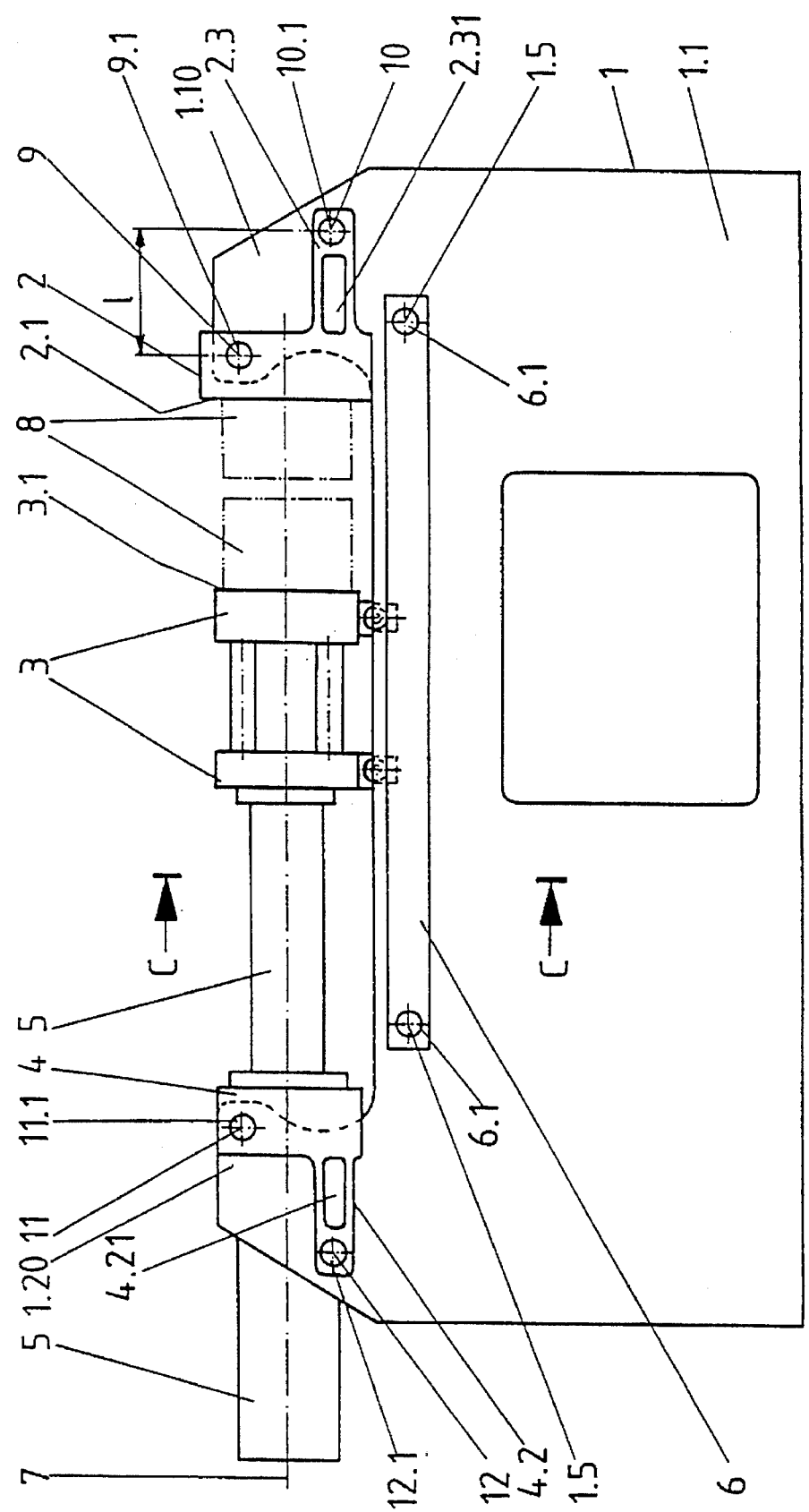
FIG. 2 illustrates a front view of a barless mold closing device with permanently arranged elastically deformable components.

In FIGS. 1 and 2, the lower horizontal bearing axes 10 and 12 are arranged in such a way that they are farther away from the mounting surfaces 2.1 and 3.1 and lie on a lower horizontal plane PHL, while the upper horizontal bearing axes 9 and 11 are closer to the mount surfaces 2.1 and 3.1 and lie on an upper horizontal plane PHU.

Figure 8:
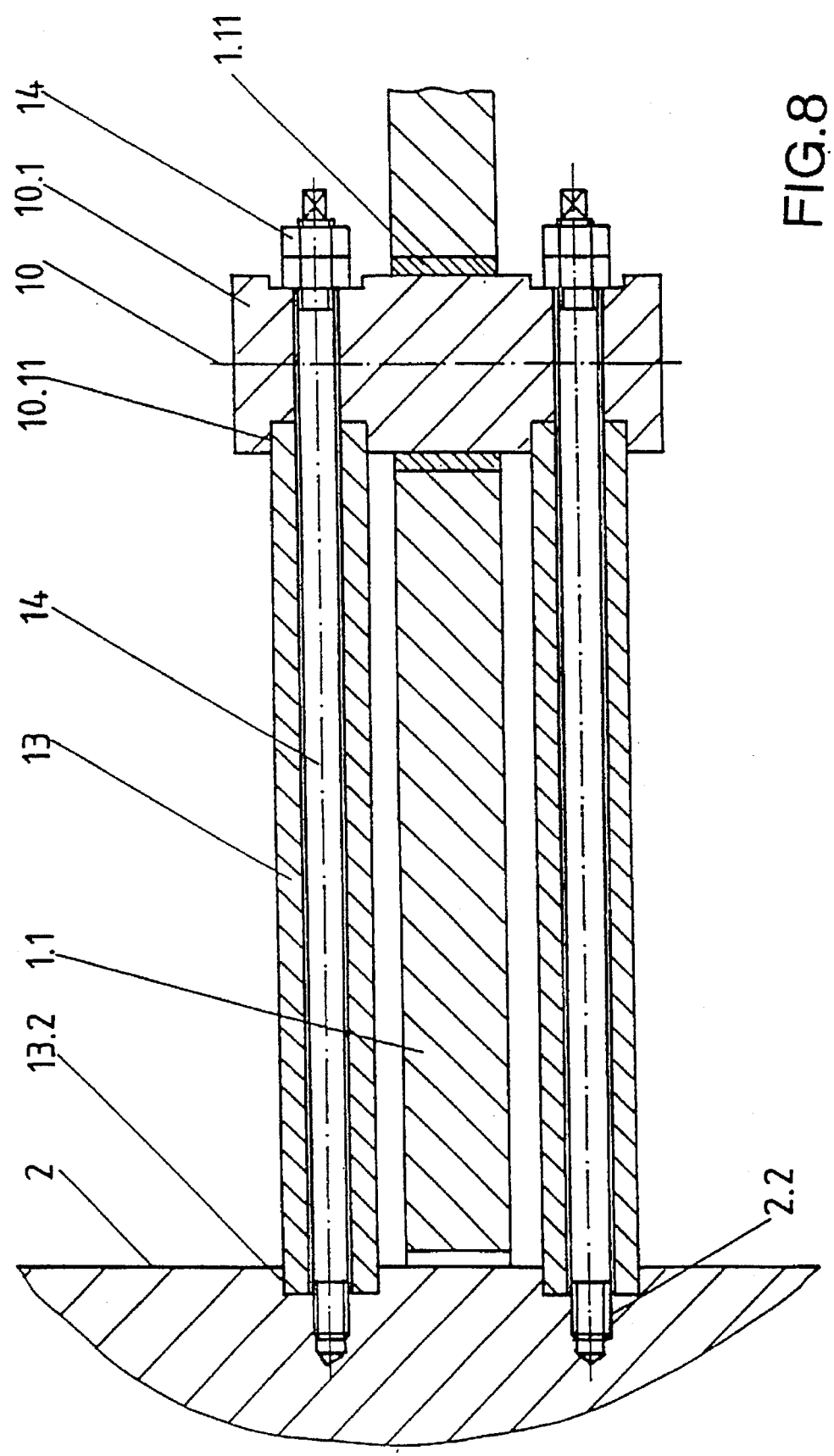
FIG. 8 is a partial section through the lower horizontal plane PHL in the area of the fixed die mounting plate according to Line B—B in FIG. 1.

FIG. 8 shows, in an enlarged partial section, the lower horizontal plane PHL with the bearing axis 10 for the fixed die mounting plate according to Line B—B in FIG. 1. The bearing axis 10 consists of a bolt 10.1, which is accommodated in a bearing bush 1.11 arranged in the side wall 1.1 of the machine frame 1. On both sides of each side wall 1.1 there are compression bars 13, which are designed as hollow cylindrical bodies and are centered and supported in declivities 10.11 on the bolt 10.1. The hollow cylindrical compression bars 13 are detachably attached between the fixed die mounting plate 2 and the bolt 10 by a screw connection 14. The upper bearing axis 9 shown in FIG. 1 for the fixed die mounting plate 2 consists of a bolt 9.1, which is mounted in the indicated bearing block 2.4. The bearing block 2.4 is attached to the fixed die mounting plate 2, and the fixed die mounting plate 2 is supported rotatably on the bolt 9.1 vis-à-vis the side walls 1.1 of the machine frame 1.

The design and arrangement of the two bearing axes 11 and 12 for accommodating the end plate 4 in the machine frame 1 is carried out analogously.

Figure 3:
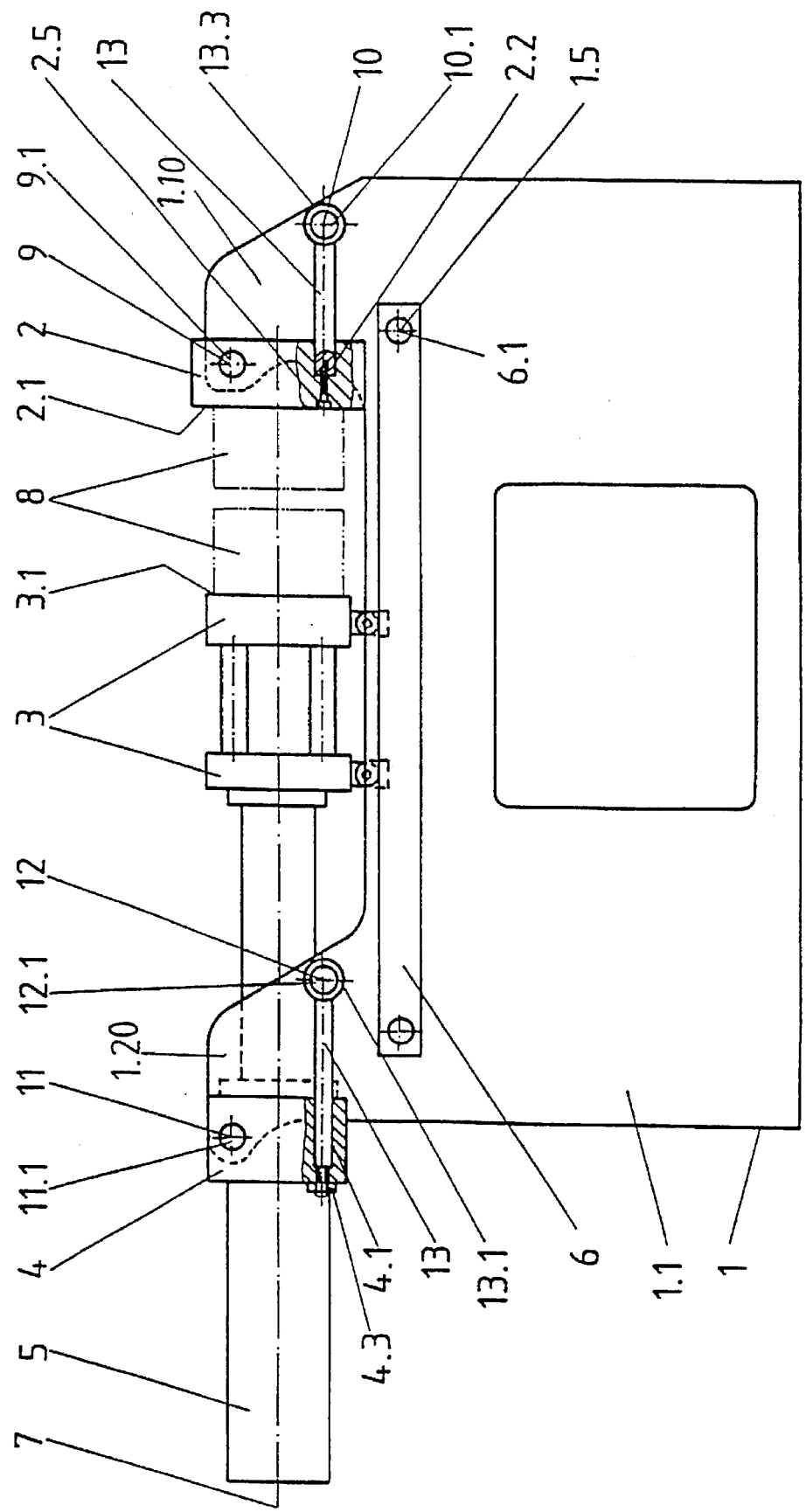
FIG. 3 illustrates a barless mold closing device with elastically deformable components between the end plate and the movable die mounting plate.

Depending on the size of the die mounting surface 2.1, at least two elastically deformably components are arranged in pairs between the mounting surface 2.1 of the fixed die mounting plate 2 and the bearing axis 10 located below the axis of injection 7. At least two further elastically deformable components are arranged in pairs between the mounting surface 3.1 of the movable die mounting plate 3 and the bearing axis 12 of the end plate 4 located below the axis of injection 7. As shown in FIGS. 1, 2 and 3, the elastically deformable components may be of different designs; however, their cross-section must be smaller than the legs 1.10, 1.20 of the machine frame 1, in order to ensure a larger elastic deformation when the mold closing and opening force or expansion forces are exerted in the molding die.

FIG. 2 shows a design for the elastically deformable components, in which the latter are a permanent part of the end plate 4 and the fixed die mounting plate 2. For this purpose, the support arms 2.3 and 4.2 are welded or cast on the back side of the fixed die mounting plate 2 and the end plate 4, respectively.

In their middle area, the support arms 2.3 and 4.2 are narrowed in cross-section by the recesses or cut-outs 2.31 or 4.21, so that they form an elastic crumple zone and are more strongly elastically deformable than the legs 1.10, 1.20 of the machine frame 1.

FIG. 3 shows another preferred embodiment for the shape and arrangement of the elastically deformable components. In FIG. 3, it can be seen that the bearing axis 12 for the end plate 4 located below the axis of injection 7 is arranged between the end plate 4 and the mounting surface 3.1 for the movable die mounting plate 3. In this arrangement, the elastically deformable component is situated between the end plate 4 and the bearing axes located below the axis of injection 7. The arrangement shown in FIG. 3 has the advantage that the frame of the mold closing device has a shorter structural length, compared to the embodiment shown in FIGS. 1 and 2.

In the embodiment according to FIG. 3, fully cylindrical compression bars 13 or tension bars, for which a different attachment is provided, are shown in pairs as elastic components. Each compression bar 13 is attached by a detachable screw connection 2.5 or 4.3, which is arranged in the graduated boring 2.2 or 4.1 of the fixed die mounting plate 2 and the end plate 4, to the side of the mounting surface 2.1 of the fixed die mounting plate 2 or the back side of the end plate 4. At its other end, each compression bar 13 has a bearing eye 13.3. Into this bearing eye 13.3 can be inserted a normal bolt 10.1 or a bolt 12.1 with a head, without a declivity, 10.11, which forms the bearing axis 10 or 12. Each bolt 10.1 or 12.1 is rotatably supported in a bearing bush 1.11 arranged in the machine frame 1. The bearing arrangement has already been partially explained in the description of FIG. 8. The result of the different arrangement of the bearing axis 12 in FIG. 3 is that during the production of the closing force, no pressure forces, but rather, in this case, pulling forces are exerted in the compression bar 13. However, it is also possible with this embodiment to provide the support arms 2.3 and 4.2, instead of the compression bars 13, on the fixed die mounting plate 2 and on the end plate 4.

Figure 7:
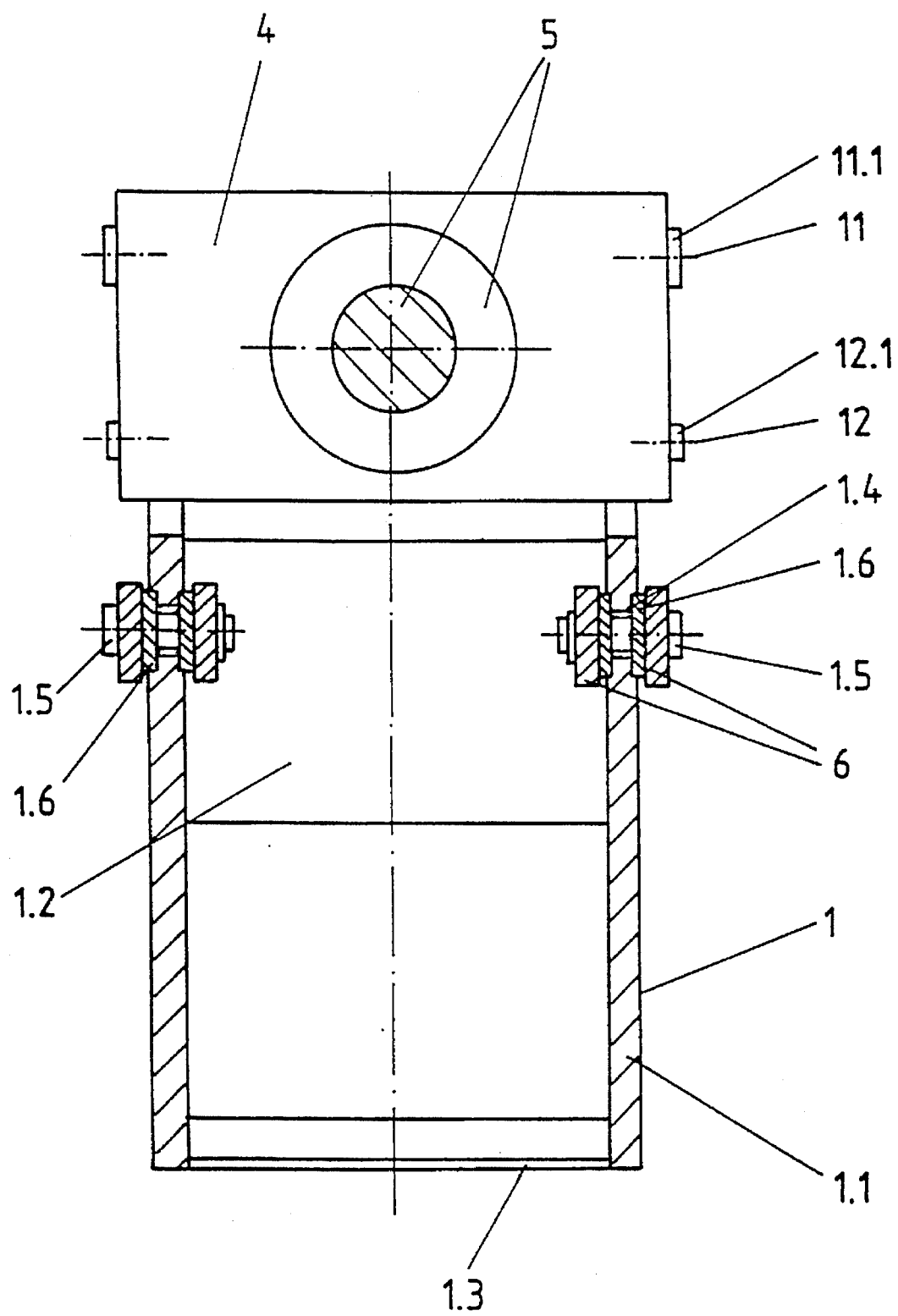
FIG. 7 illustrates a side view of the barless mold closing device according to Line A—A in FIG. 1.

Below and between the end plate 4 and the fixed die mounting plate 3 on both sides of each side wall 1.1 of the machine frame, there are guide rails 6, which are connected to the machine frame 1 at their ends via joints 6. I. FIG. 7 shows an embodiment corresponding to the section view of Line A—A in FIG. 1. Each joint 6.1 consists of a bolt 1.5, which is mounted in a bush 1.4 arranged in the side wall 1.1 of the machine frame 1. On both sides of each side wall 1.1 there are spacing disks 1.6, by means of which the guide rails 6 arranged on the bolt 1.5 are kept at a distance relative to the machine frame 1.

Figure 9:
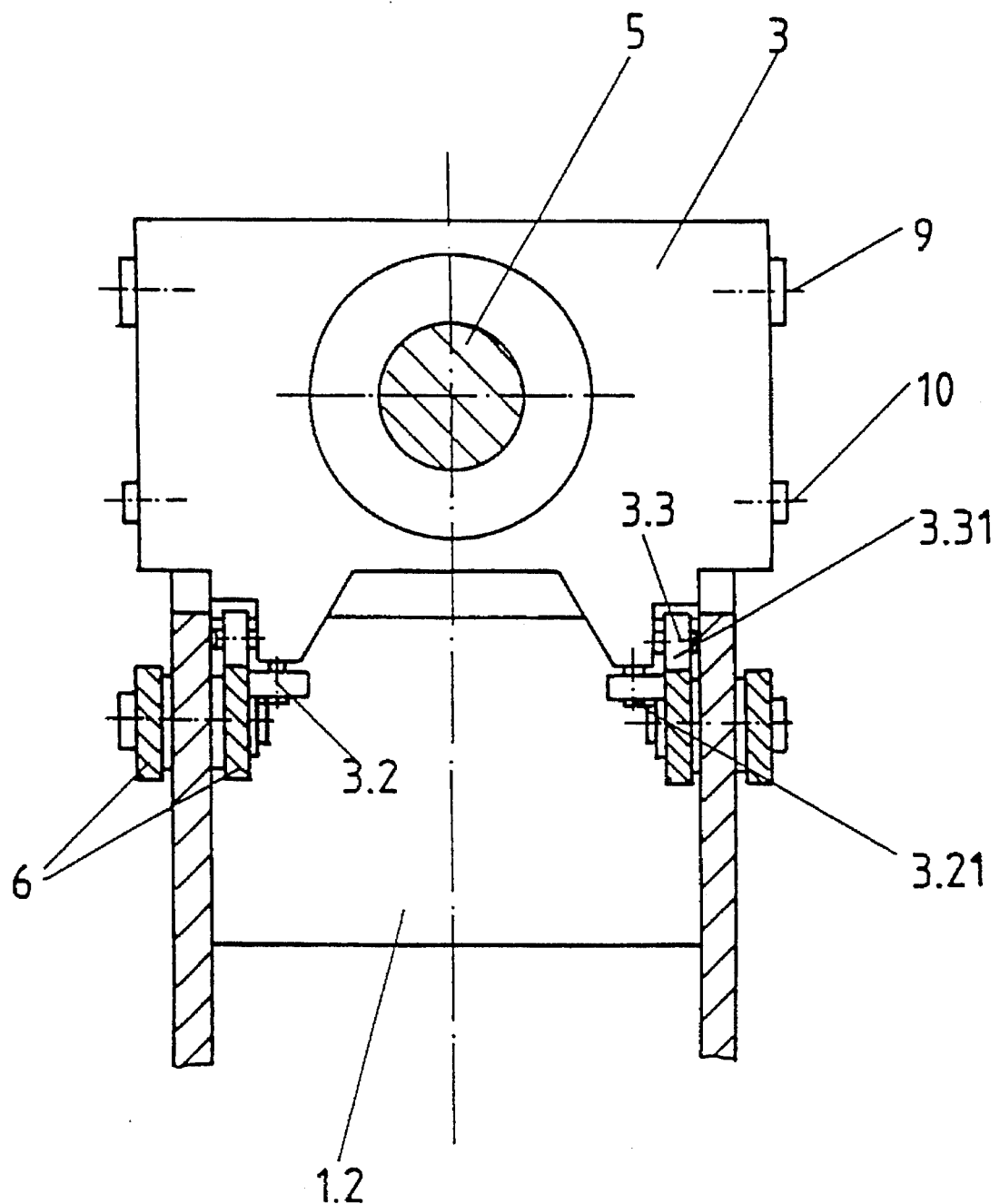
FIG. 9 is a section according to Line C—C in FIG. 2 with a roller guide for the movable die mounting plate.
Figure 10:
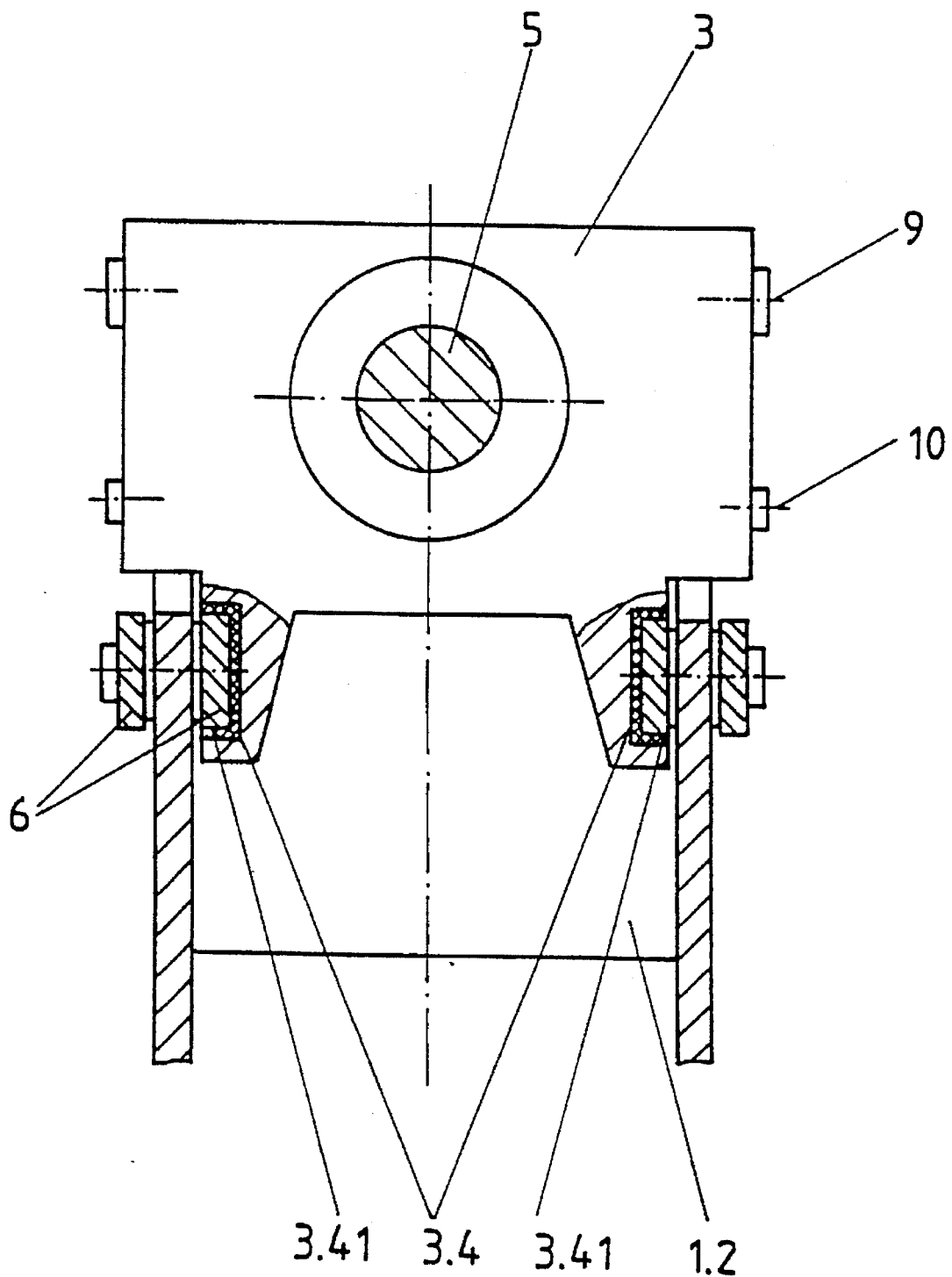
FIG. 10 is a section according to Line C—C in FIG. 2 with a sliding guide for the movable die mounting plate.

Each bolt 1.5 is secured by securing components, which are not described further. FIGS. 9 and 10 show, alternately, a roller guide and a sliding guide for the movable die mounting plate 3 according to Line C—C in FIG. 2. In FIG. 9, the movable die mounting plate 3 has an angled contour on the underside on both sides. The contour makes it possible to arrange and support the rollers 3.21 in a vertical bearing axis 3.2 and the rollers 3.31 in a horizontal bearing axis 3.3 in a rotatable fashion, so that when the movable die mounting plate 3 carries out a traversing movement, this movable die mount plate 3 is able to roll on and is supported on the guide rails 6.

Instead of a roller guide, a sliding guide may be provided in order to guide and support the movable die mounting plate 3 on the guide rails 6. For this purpose, laterally milled grooves 3.4 are provided on the underside of the movable die mounting plate 3; these grooves 3.4 are lined on all sides with sliding material 3.41 and on three sides encompass the guide rails 6, which are located on the inner side of the machine frame 1.

Figure 6:
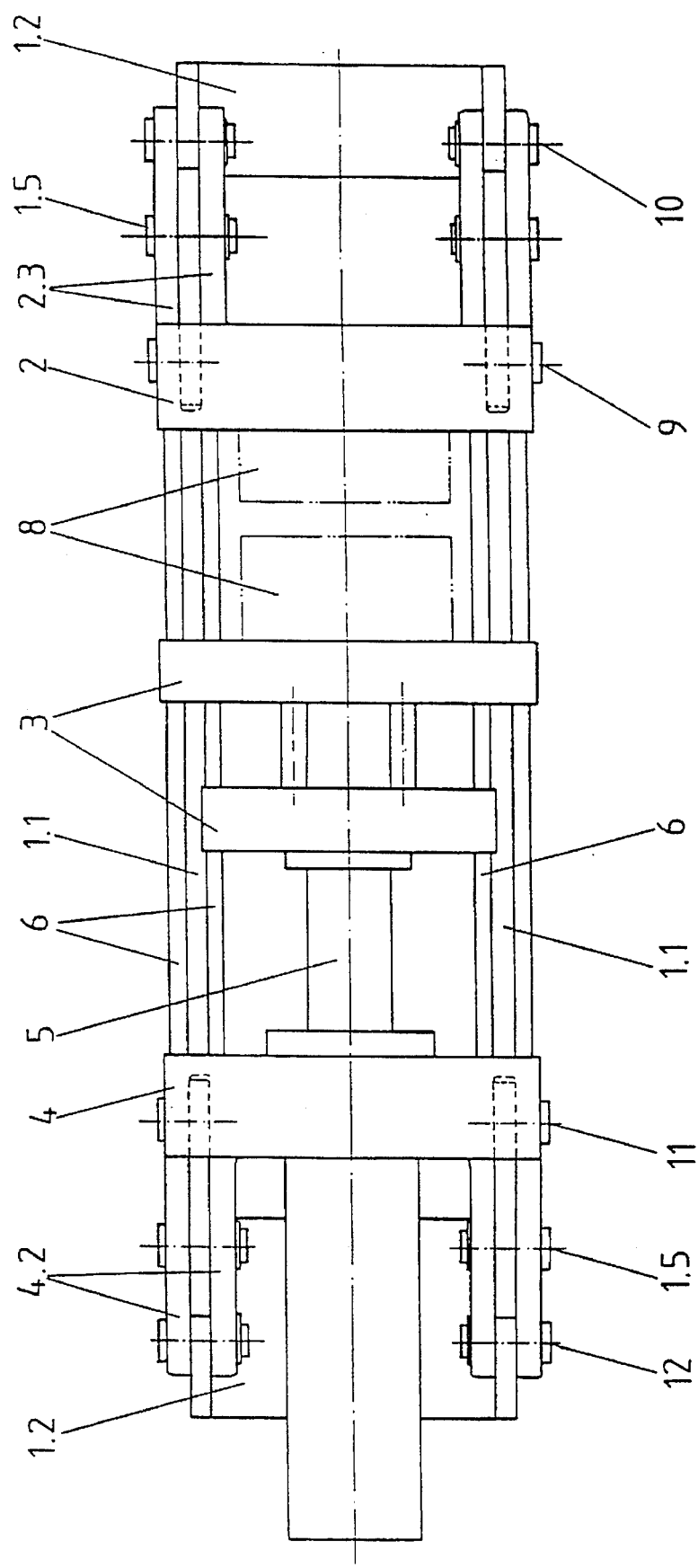
FIG. 6 illustrates a top view of a barless mold closing device with permanently arranged elastically deformable components.

FIG. 6 shows a top view of a mold closing device according to the invention. It can be seen that the elastically deformable components on the end plate 4 and the fixed die mounting plate 2 consist of support arms 4.2 and 2.3, which are cast or welded on and are part of the end plate or the fixed die mounting plate. It can also be seen that, compared to known barless mold closing devices, it was possible to reduce the amount of material used for this mold closing device.

Figure 4:
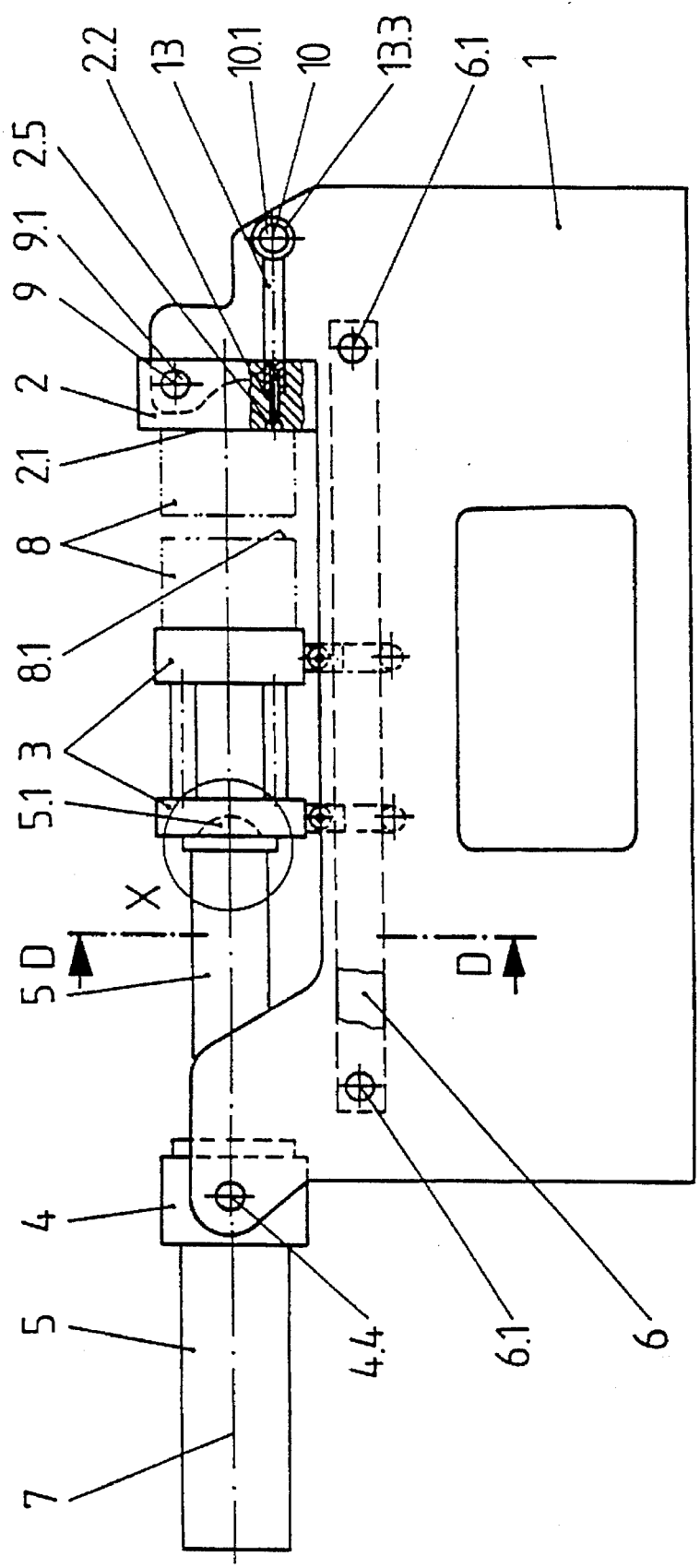
FIG. 4 illustrates a barless mold closing device with a biaxially-supported fixed die mounting plate and a uniaxially-supported end plate.

FIG. 4 shows a front view of a barless mold closing device, in which only the fixed die mounting plate 2 is supported in the leg 1.10 of the C-shaped machine frame 1 in the two bearing axes 9 and 10, which are designed as the bolts 9.1 and 10.1. The bearing axis 9 is located above the axis of injection 7 and the bearing axis 10 is located below this axis 7. The two respective bearing axes 9 and 10 have different distances to the die mounting surface 2.1. The bolt 9.1 is supported in a bearing bush (not shown) in the machine frame 1 and accommodates the fixed die mounting plate 2 in the upper area. At the right end, the compression bars 13 arranged below the axis of injection 7 have a bearing eye 13.3, into which the bolt 10.1 can be inserted, which is supported in a bearing bush (not shown) in the machine frame 1. The compression bar 13 can be inserted by its other end into a graduated boring 2.2 located in the fixed die mounting plate 2. The compression bar 13 is attached in an adjustable manner by a screw connection 2.5, which is activated from the side on which the die mounting surface 2.1 is located. The fixed die mounting plate 2 is thus not tiltable around an axis. Instead, when the mold closing and opening force is exerted, the fixed die mounting plate 2 is also elastically deformed by the elastic components 13, which consist of compression bars, arranged below the axis of injection 7. The result of this elastic deformation, which occurs parallel to the expansion of the C-shaped machine frame 1, is that no angular deviation can be transmitted to the vertical position of the die mounting surface 2.1 of the fixed die mounting plate 2 by the deformation of the machine frame 1. Thus, the deformation of the fixed die mounting plate 2 is connected to the deformation of the machine frame 1. In contrast, the linear drive 5, which consists of a working cylinder, is mounted rotatably in the machine frame 1 directly via a joint 4.4 or via the end plate 4 and a joint 4.4. The piston rod of the working cylinder 5 is also connected to the movable die mounting plate 3 via a joint 5.1, which is designed in the example as a calotte bearing.

Figure 12:
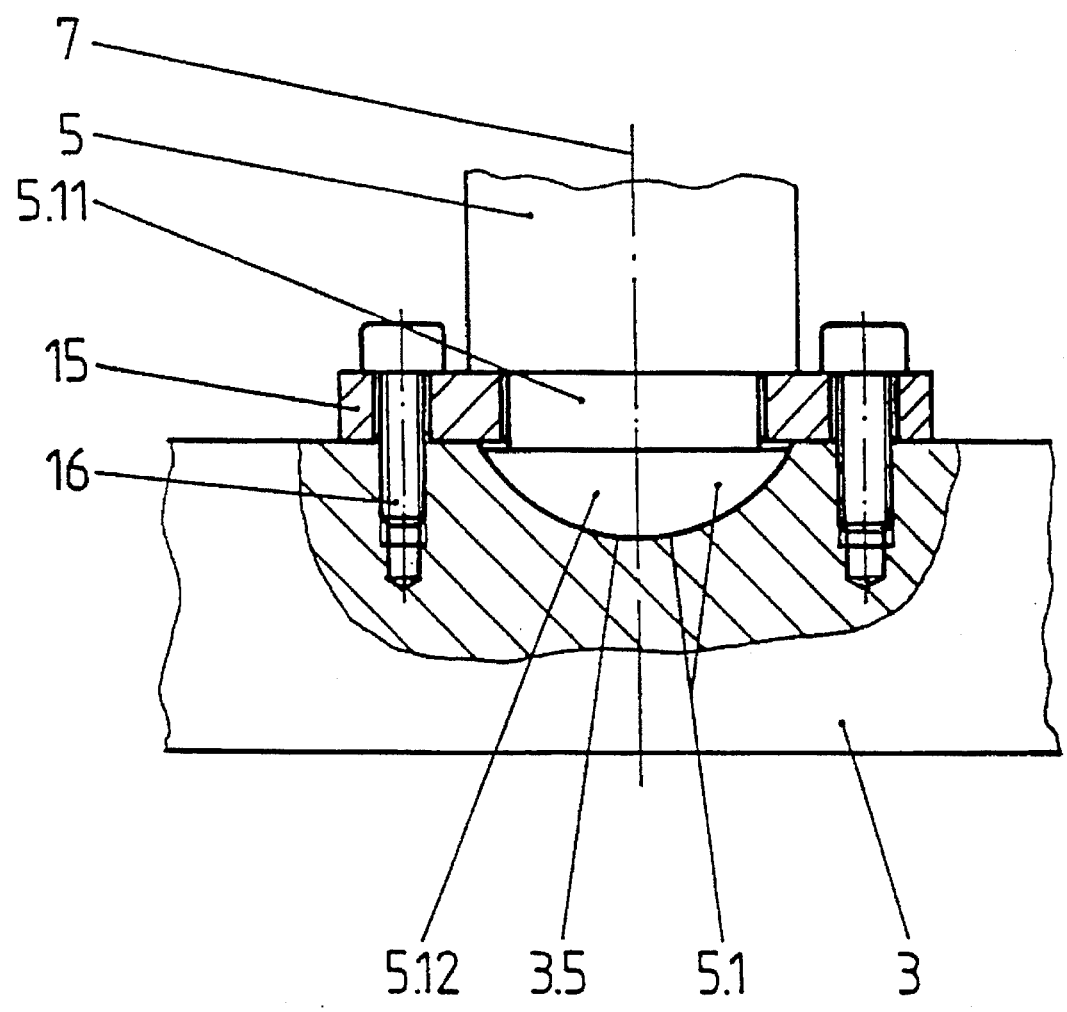
FIG. 12 is an enlarged detail X from FIG. 4.

FIG. 12 shows an enlarged detail of the joint 5.1 designed as a calotte bearing. At the end, the piston rod of the working cylinder 5 has a ring groove 5.11, to which a joint head 5.12 is attached on the front side. There is a calotte-type recess 3.5 in the movable die mounting plate 3. The joint head 5.12 of the piston rod of the working cylinder 5 lies on the calotte-type recess 3.4 and can be turned therein; this joint head 5.12 is detachably connected by a divided ring flange 15 and a screw connection 16 to the movable die mounting plate 3. In comparison to the fixed die mounting plate 2, because of the articulated bearing of the end plate 4 and the linear drive 5 in the machine frame 1, on the one hand, as well as the articulated connection between the movable die mounting plate 3 and the piston rod of the linear drive 5, on the other hand, the latter, during the deformation of the machine frame 1, are disconnected from its deformation by the mold expansion forces during the exertion of the closing force. In addition, however, a reliable guide of the movable die mounting plate 3 relative to the fixed die mounting plate 2 is also needed.

Figure 11:
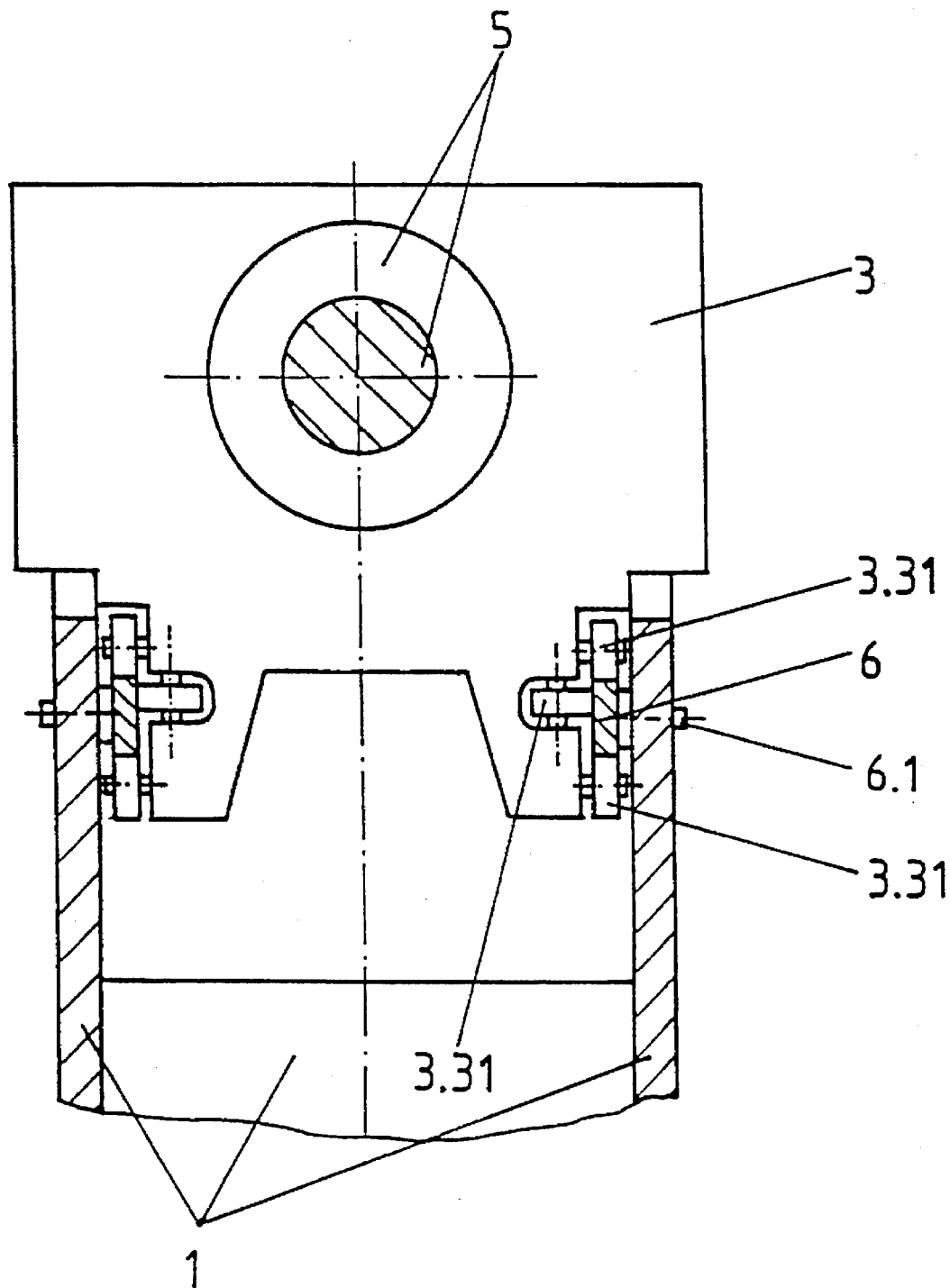
FIG. 11 is a section according to Line D—D in FIG. 4 with a different roller guide for the movable die mounting plate.

FIG. 11 shows, in a sectional view according to Line D—D in FIG. 4, a possible embodiment for the guide of the movable die mounting plate 3. On both inner sides of the machine frame 1 and separated therefrom, the guide rails 6 are arranged, being supported at their ends in joints 6.1. Above, below and to the side, the rollers 3.3 1, which are mounted adjustably in the movable die mounting plate 3, lie on the guide rails 6.

Figure 5:
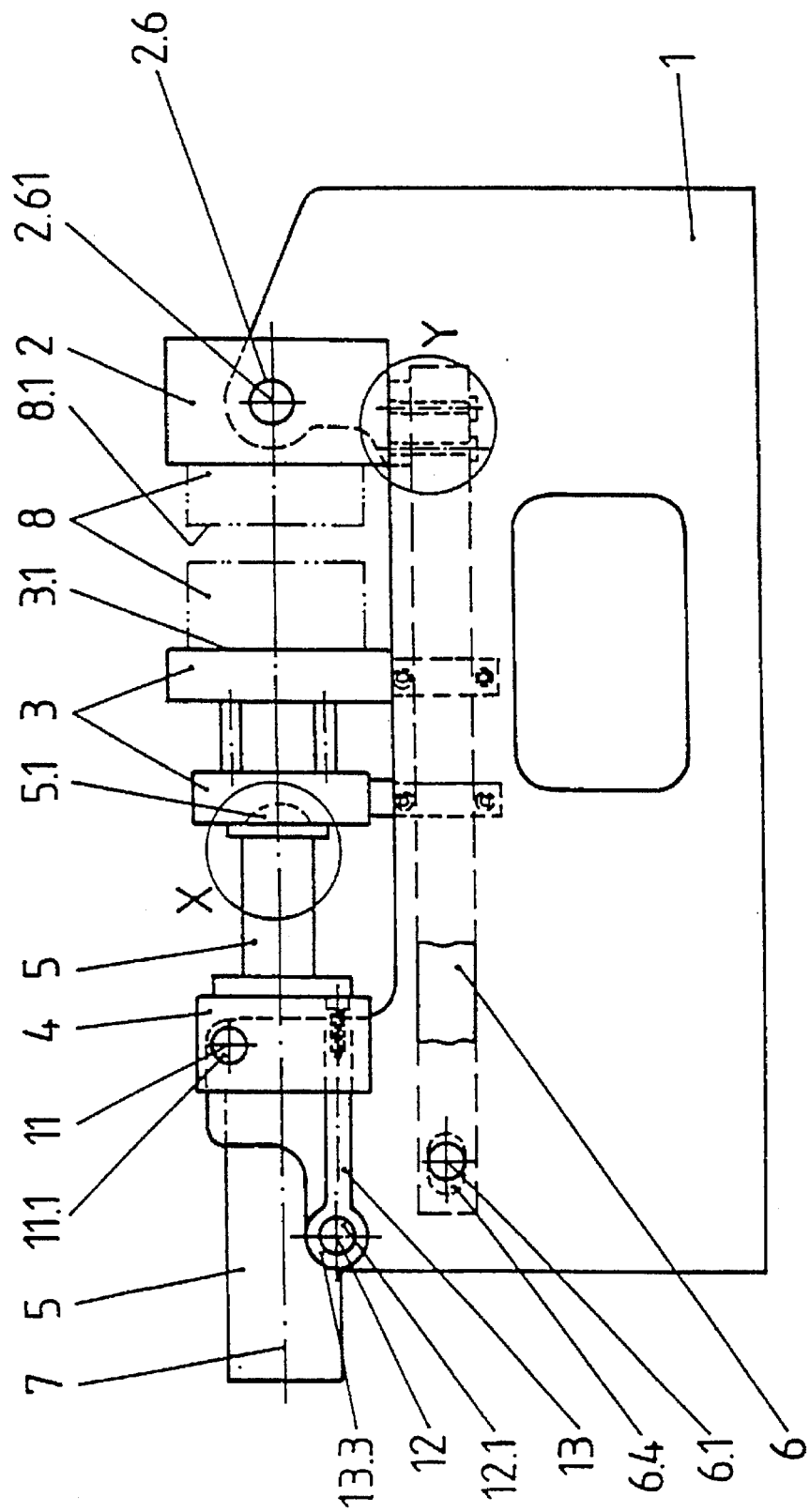
FIG. 5 illustrates a barless mold closing device with an uniaxially-supported fixed die mounting plate and a biaxially-supported end plate.
Figure 13:
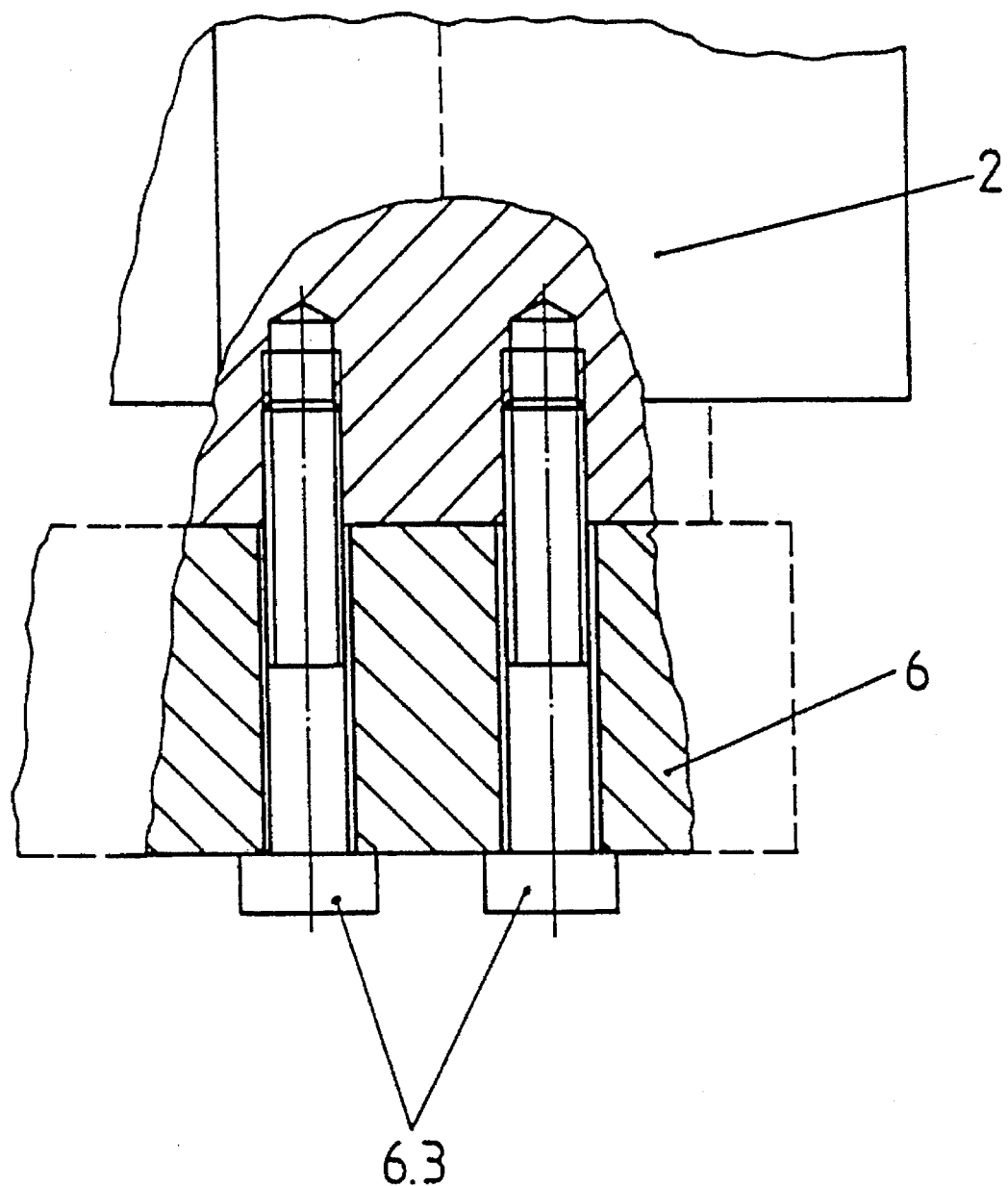
FIG. 13 is an enlarged detail Y from FIG. 5.

Another embodiment, partially the reverse of that shown in FIG. 4, can be seen in FIG. 5. In this example, the end plate 4 with the linear drive 5 is accommodated in the machine frame 1 in the upper bearing axis 11 and the lower bearing axis 12, which are designed as the bolts 11.1 and 12.1. At the left end, the elastically deformable compression bars 13 have a bearing eye 13.3, into which the bolt 12.1 can be inserted, which is accommodated by a bearing bush (not shown) in the machine frame 1. Analogously, the compression bar may be inserted by its other end into a graduated boring, which is located in the end plate 4, and adjustably connected by a screw connection to the end plate 4. Through the elastically deformable compression bars 13, the end plate 4 is connected to the elastic deformation of the machine frame 1 in a corresponding manner, whereby the angular change is compensated for by means of the compression bars 13. In order to relieve the piston rod of the working cylinder 5 from possible traverse forces and to protect the die guides (not shown) of the molding die 8 when the closing force is exerted, the piston rod and the movable die mounting plate 3 are also connected to one another by a joint 5.1. In addition, the piston rod guide is also protected through the joint 5.1, which prevents a static coincidence through a triple bearing. The fixed die mounting plate 2 located opposite is, in this example, supported on both sides in the machine frame 1 in joints 2.6, so as to be tiltable around an axis 2.61. Below the fixed die mounting plate 2, the guide rails are detachably attached to one another on the inner side of the machine frame 1 by screw connections 6.3. FIG. 13 shows an enlarged detail of this. At the other end of the machine frame 1, the guide rails 6 are accommodated in a joint 6.1. Upon the deformation of the machine frame 1 by the mold expansion forces, the joint 6.1 slides into a short longitudinal slot 6.4, which is located in each guide rail 6. In this way, the complete disconnection of the fixed die mounting plate 3, the movable die mounting plate 3 as well as the guide rails 6 from the elastic deformation of the machine frame 1 is ensured. In contrast, the elastic deformation of the machine frame 1 is completely transmitted to the end plate 4 with the elastically deformable components 13 and is compensated for by the latter in such a way that the horizontal position of the linear drive 5 does not change. Thus, in this design variant, too, when the mold expansion forces are exerted, an exact parallelism of the mold halves of the molding die 8 in the die separation plane 8.1 is ensured.

Figure 14:
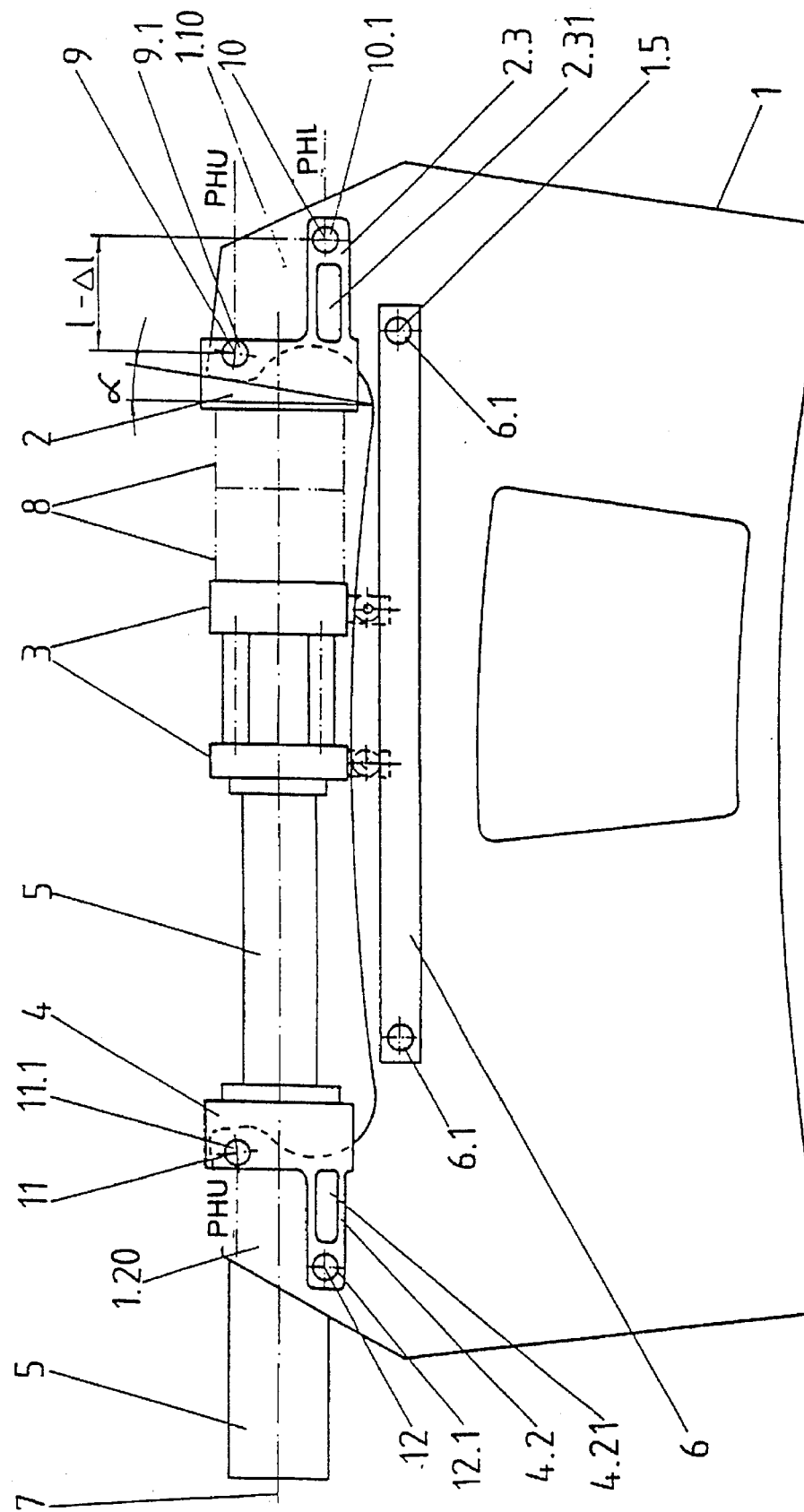
FIG. 14 illustrates a barless mold closing device in the closed position with an exaggerated depiction of deformation of the machine frame.

The manner in which the solution according to invention functions is explained below in reference to the mold closing device shown in FIG. 14. In the illustrated closed position, when the closing force is built up by the linear drive 5, the machine frame 1 (shown here in an exaggerated manner) is deformed. The application of force above the (non-depicted) neutral axis leads to a longitudinal expansion of the machine frame as well as to a superimposed bending deformation. As this happens, the upper right and left sections of the machine frame 1 incline outward by the angle α. This leads the bolts 9.1 and 10.1 as well as the bolts 11.1 and 12.1, respectively, which are separated from one another by the distance l, to approach one another horizontally by the mount Δl. Through the joint action of the two respective bearing axes 9, 10 and 11, 12, any degree of freedom for the fixed die mounting plate 2 or the end plate 4 is avoided. In this way, the overall inclination of the leg 1.10, 1.20 of the machine frame 1 on the connection line between the bearing axes 9, 10 is transmitted to the respective plates 2, 4. In the elastic part of the plate, this inclination is compensated for by the support arms 2.3 and 4.2. In a bearing not according to the invention of the fixed die mounting plate 2 and the end plate 4, an inclination of the fixed die mounting plate 2 and the end plate 4 by the same angle would also automatically occur. The result would be the opening of the molding die, the unwanted emergence of plastic mass, and/or a possible destruction of the die guides. Through the elastically deformable components, which in FIG. 14 consist of the cast-on support arms 2.3 and 4.2 and are reduced in cross-section by the cut-outs 2.31 and 4.21, the support arms 2.3 and 4.2 are elastically compressed by the amount Δl. In this way, it is ensured that the inclination of the machine frame 1 is not transmitted to the die mounting surface 2.1 of the fixed die mounting plate 2. In addition, the elastic deformation of the machine frame 1 is completely transmitted to the end plate 4 with the elastically deformable support arms 4.2 and is compensated for by the latter in such a way that the horizontal position of the linear drive 5 does not change.

Because the deformation of the machine frame 1 and of the elastically deformable components is always proportional to the exercised closing force, the plane parallelism of the two die halves of the molding die 8 is maintained under closing force and opening force of any size. Furthermore, because of the articulated bearing of the guide rails 6 in two axes on the bolts 1.5, the deformation of the machine frame 1 cannot cause the guide rails 6 to bend, so that these rails maintain their horizontal position for the guidance of the movable die mounting plate.

Thus, while there have shown and described and pointed out fundamental novel features of the invention as applied to preferred embodiments thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. It is the intention, therefore, to be limited only as indicated by the scope of the claims appended hereto.

What is claimed is:

1. A barless mold closing device for injection molding machines comprising:

a C-shaped machine frame (1) having a first leg (1.10) and a second leg (1.20);

a fixed die mounting plate (2) disposed on said first leg (1.10);

an end plate (4) disposed on the second leg (1.20);

an axial linear drive (5) disposed between said legs;

a movable die mounting plate (3) disposed on a guide rail (6) and said linear drive (5);

the fixed die mounting plate (2) comprising a first mounting surface (2.1);

the movable die mounting plate (3) comprising a second mounting surface (3.1);

an injection mold die (8) comprising two mold halves and having an axis of injection is disposed between the first mounting surface and the second mounting surface;

the fixed die mounting plate (2), the end plate (4), the movable die mounting plate (3), and the injection mold die (8) are co-axially arranged with the linear drive; whereby the fixed die mounting plate (2) and the end plate (4) are arranged between said legs in at least two horizontally running bearing axes (9, 10, 11, 12) above and below the axis of injection (7), whereby the end plate (4) and the fixed die mounting plate (2) are connected to the lower bearing axes (10, 12), each via at least one elastically deformable component (13), for substantially absorbing the expansion of the C-shaped machine frame (1) produced by an occurring closing force or locking force by a defined elastic deformation of the components (13), so that the mounting surfaces (2.1, 3.1) of the die mounting plates (2, 3) remain vertical without angular deviation.

2. A barless mold closing device for injection molding machines comprising a C-shaped machine frame (1) having two legs (1.10) (1.20), on one leg (1.10) is arranged a fixed die mounting plate (2) and on the other leg (1.20) is arranged an end plate (4), between the fixed die mounting plate (2) and the end plate (4) is arranged a movable die mounting plate (3), said movable die mounting plate (3) being longitudinally movable on guides toward the fixed die mounting plate in a direction of an axis of injection (7) with the aid of a linear drive (5) which is supported between the end plate (4) and the movable die mounting plate (3), and in which the fixed die mounting plate (2) and the movable die mounting plate (3) have mounting surfaces (3.1) (2.1) oriented vertical to the axis of injection (7) for holding each a die half of a molding die (8), and in which a mold closing and a mold opening force produced during an injection and opening process by the linear drive is absorbed by the machine frame, wherein the fixed die mounting plate (2) is disposed between the two legs of the machine frame (1) in at least two horizontally running bearing axes (9, 10) above and below the axis of injection (7) and being connected to the lower bearing axis (10) via at least one component (13) that is elastically deformable in such a way that the expansion of the C-shaped machine frame (1) produced by an occurring closing force and locking force is balanced by a defined elastic deformation of the component or components (13) such that the mounting surface (2.1) of the fixed die mounting plate (2) remains vertical.

3. A barless mold closing device for injection molding machine comprising a C-shaped machine frame having two legs, on one leg is disposed a fixed die mounting plate and on the other leg is disposed an end plate, between which a movable die mounting plate is longitudinally movable on guides toward the fixed die mounting plate in the direction of an axis of injection with the help of a linear drive which is supported between the end plate and the movable die mounting plate, and in which the fixed die mounting plate and the movable die mounting plate have mounting surfaces oriented vertical to the axis of injection for holding the die halves of a molding die, and in which the mold closing and opening force that is produced during the injection and opening process by the linear drive is absorbed by the machine frame, whereby the end plate is mounted between said two legs of the machine frame in at least two horizontally running bearing axes above and below the axis of injection and is connected to the lower bearing axis via at least one component that is elastically deformable so that the expansion of the C-shaped machine frame produced by an occurring closing force or locking force is balanced by a defined elastic deformation of said at least one component for maintaining the mounting surface of the movable die mounting plate and the end plate in vertical position.

4. The barless mold closing device as in claim 1, further comprising upper bearing axes (9, 11) arranged above the axis of injection (7) and disposed on an upper horizontal plane (PHU) and lower bearing axes (10, 12) arranged below the axis of injection (7) and disposed on a lower horizontal plane (PHL), whereby the upper bearing axes (9, 11) and the lower bearing axes (10, 12) have different distances to the mounting surfaces (2.1, 3.1) of said die mounting plates (2, 3).

5. The barless mold closing device as in claim 2, wherein said linear drive (5) is uniaxially accommodated in said machine frame (1) through a joint (4.4) via said end plate (4) and wherein the movable die mounting plate (3) and the linear drive (5) are connected to one another via a ball joint (5.1).

6. The barless mold closing device as in claim 3, wherein the fixed die mounting plate (2) is uniaxially supported in the machine frame (1) through a joint (2.6) and wherein the movable die mounting plate (3) and the linear drive (5) are connected to one another via a ball joint (5.1).

7. The barless mold closing device as in claim 6, wherein a pair of guide rails (6) is rotatably connected to the machine frame (1) via joints (6.1), and arranged on both sides of the machine frame (1) below and between the end plate (4) and the fixed die mounting plate (2).

8. The barless mold closing device as in claim 7, wherein the movable die mounting plate (3) is guided and supported on the guide rails (6) in a longitudinally movable manner.

9. The barless mold closing device as in claim 8, wherein the elastically deformable components are compression bars (13) arranged in pairs, which are detachably connected to the end plate (4) and to the bearing axes (10, 12) located below the axis of injection (7) in the machine frame (1).

10. The barless mold closing device as in claim 8, wherein the elastically deformable components comprise support arms (2.3) and (4.2) and are reduced in cross-section in a middle area by recesses or cut-outs (2.31, 4.21).

11. The barless mold closing device as in the claim 10, further comprising side walls (1.1) of the machine frame (1), said side walls (1.1) supporting said guide rails (6) on a bolt (1.5) in joints (6.1) on each side wall (1.1) of the machine frame (1) and wherein the bolt (1.5) is accommodated in bearing bushes (1.4), which are arranged in the side walls (1.1) of the machine frame (1).

12. The barless mold closing device as in claim 11, further comprising a plurality of rollers (3.21) (3.31) and bearing axes (3.3), wherein the movable die mounting plate (3) has an under side and wherein the rollers (3.21) and (3.31) are mounted on the under side in vertical bearing axes (3.2) and horizontal bearing axes (3.3) for rolling on the guide rails (6).

13. The barless mold closing device as in claim 11, further comprising grooves (3.4) lined with sliding material (3.41) and wherein on an under side of the movable die mounting plate (3), the grooves (3.4) are laterally arranged so as to encompass the guide rails (6).

14. The barless mold closing device as in claim 12, wherein the rollers (3.31) are arranged on the movable die mounting plate (3) and encompass the guide rails (6) in cross direction for rolling along the guide rails (6) in the longitudinal direction.

15. The barless mold closing device as in claim 14, wherein on an inner side of the machine frame (1), the guide rollers (6) are detachably connected to the fixed die mounting plate (2) and to the machine frame (1) via a joint (6.1).

* * * * *